Aug. 3, 1965    E. G. SUKUP    3,198,493
PORTABLE GRAIN AERATION DEVICE
Filed June 12, 1963

INVENTOR
EUGENE G. SUKUP
BY
Dick, Zarley & Henderson
ATTORNEYS

United States Patent Office 3,198,493
Patented Aug. 3, 1965

3,198,493
PORTABLE GRAIN AERATION DEVICE
Eugene G. Sukup, Dougherty, Iowa
Filed June 12, 1963, Ser. No. 287,421
1 Claim. (Cl. 259—111)

This invention relates to a device for the aeration of stored grain to prevent overheating and spoilage thereof. The stockpiling of grain and many other farm products in storage buildings, bins and like structures, or in the open, to await favorable marketing times, or until it becomes desirable to make ultimate use of the harvested produce has been a hazardous and expensive operation due to the normal respiration processes of the plant life which results in the exuding of heat and moisture during the drying out of green produce and during long storage periods of closely piled produce.

The overheating occurs in certain areas which tend to form when a bin, for example, is approximately three-quarters full. These areas are commonly called "hot spots," and when formed adjacent the upper surface of the grain have a crust formed thereover.

Many devices have been manufactured and marketed in recent years from complicated stationary aerating devices to bulky, unwieldy and costly portable devices. To applicant's knowledge, these devices are concerned with forcing air downwardly into the grain, and are "breathing" type aerators. Applicant's device, however, is concerned first with breaking up hot spots so that air, not from above the stockpiled grain, but from the conventional equipment and structure inherent in the bottom of a commercial grain bin having perforated flooring. Thus, the air normally transmitted upwardly through the grain can pass through the broken up area instead of bypassing it.

Secondly, the applicant's device is concerned with cost. Since these hot spots, or wet grain pockets do not form until the grain bin is approximately three-quarters full, the average investment of some $500.00 for an automatic, thermostatically controlled unit does not seem warranted when applicant's device can be made and sold for under $50.00, one-tenth of the above figure.

It is, therefore, an object of this invention to provide a new and novel portable grain aeration device.

It is another object of this invention to provide a novel aeration device which is readily portable.

It is still another object of this invention to provide a portable grain aeration device which is easily attachable to the existing roof structure of a conventional grain bin.

Yet another object of this invention is to provide a novel aeration device which is comprised simply of an auger, an electric hand drill, and a length of chain, which elements combined to form an aeration device readily and easily attached to the upper roof portion of a grain bin for stirring the grain stored in the upper portion of the bin, thereby enabling the passage of air through the grain.

Yet another object of this invention is to provide an aeration device capable of attaining the above mentioned objectives, which is economical of manufacture, simple but rugged of structure, and effective in use.

These objects, and other features and advantages of this invention will become readily apparent upon reference to the following description, when taken in conjunction with the accompanying drawings, wherein.

Figure 1:
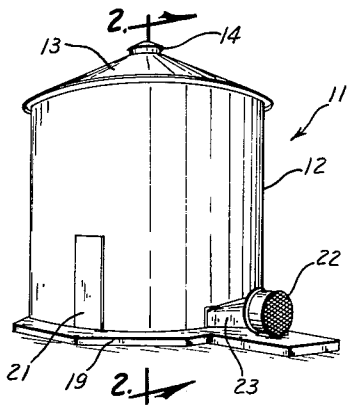
FIG. 1 is a perspective view of a conventional grain bin.

Referring now to the drawings, the portable aeration device of this invention is designated generally at 10 in FIG. 1, and is adapted for use inside a commercially available grain bin 11.

The grain bin 11 comprises a circular side wall 12 of galvanized steel having an umbrella-type roof 13 supported thereon, which roof 13 is provided with a ventilator cover 14. The ventilator may be adjustable to regulate the air flow therethrough, as is conventionally provided.

Figure 2:
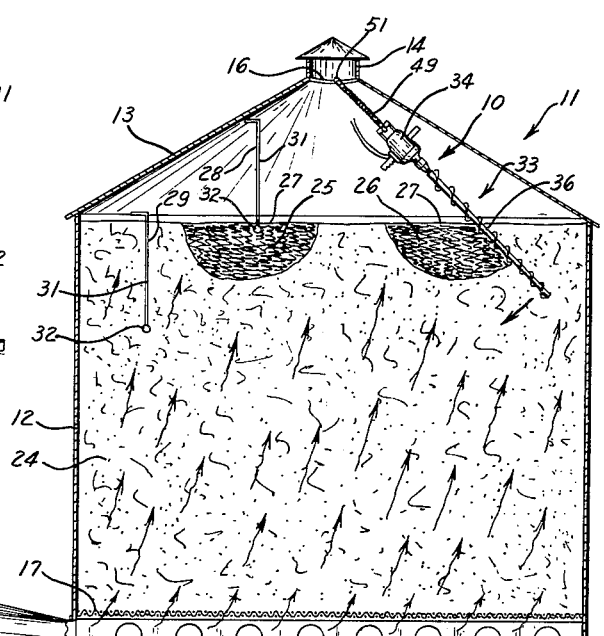
FIG. 2 is an enlarged section of the grain bin taken along the line 2—2 in FIG. 1.

An opening 16 of circular design is formed in the upper portion of the roof of 13, with a series of arcuate pockets (not shown) formed about the opening 16 (FIG. 2) by the metal joints of the roof panels. The purpose of these pockets will be set forth hereinafter. At the bottom of the grain bin 11, a circular perforated drying floor 17 is provided mounted on a steel understructure which includes a plurality of floor channels 18 (FIG. 2). The grain bin 11 as a whole is mounted on a concrete foundation 19, and includes a walk-in door 21.

For supplying fresh air internally of the bin 11 for passage through grain therein, a fan 22 (FIGS. 1 and 2) is mounted on a portion of the foundation 19, and upon operation forces air through a transition unit 23 beneath the perforated floor 17.

Upon filling the grain bin 11 with grain 24 (FIG. 2) quite often when the bin is about three-quarters full, grain pockets form which are sufficiently "wet" to prevent the passage of air therethrough. A pair of such wet pockets 25 and 26 are illustrated in section in FIG. 2, each having a crust 27 thereon at the upper level of the grain 24. These wet pockets are usually termed "hot spots," and if not removed as by stirring of the grain to provide air flow therethrough, result in spoilage of the grain.

To locate such pockets, a pocket locator 28 and 29 is provided, each locator comprising an elongated rod 31 with a ball 32 at one end thereof. If a locator, 29 for example, is dropped into dry grain, with the ball 32 first, it will fall easily therethrough until a handle portion (unnumbered) prevents further falling. However, if a locator, such as 29, is attempted to be dropped through a wet pocket 25, the rod 31 will not fall. The locator 29 may then be manually forced through the pocket to determine the depth thereof as once it is forced completely through, it will again fall easily until the handle portion again prevents further fall.

Figure 3:
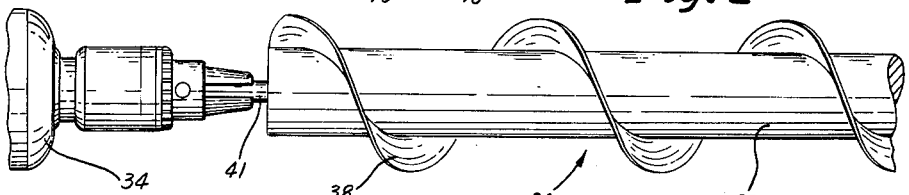
FIG. 3 is an enlarged fragmentary side elevational view of a portion of the portable grain aeration device of this invention.
Figure 4:
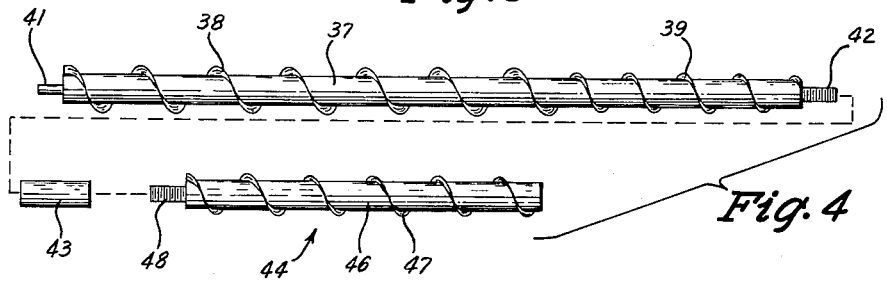
FIG. 4 is a reduced, exploded view of the auger and flighting arrangement of this invention.

When a pocket, such as 26, is located, it is as mentioned hereinbefore desirable and necessary to break up such a pocket. To do so, an auger unit 33 (FIG. 2) is provided. This unit 33 comprises a one-half inch electric drill 34 of a conventional nature adapted to rotate an auger 36. The auger 36 includes a shaft 37 having a first flighting 38 and a second flighting 39 thereon. At one end a bit 41 is provided for attachment by the drill 34, and at the other end 42 (FIG. 3) the end is threaded for a purpose hereinafter described. Extensive testing and development of this auger unit 33 discloses that a preferred embodiment of the shaft 37 is a solid shaft, one inch in diameter and five feet in length. The first flighting 38 is a preferred three and one-half inches in diameter, said diameter including that of the shaft, for a length of approximately three feet four inches. The remaining second flighting 39 is preferred to have a diameter of two inches, including that of the shaft 37, for the remaining one foot eight inches of the total five foot length of the shaft 37. Both the bit 41 and the threaded end 42 preferably have approximately a two inch length.

Should the auger 36 be insufficient in length to completely break up a pocket 25 or 26, an extension 44 is provided for attachment to the shaft 37 by a coupling 43, both internal ends of which are threaded.

The extension 44 includes a shaft 46 having a flighting 47 mounted thereon, and which extension has an end 48 threaded to be received in the coupling 43. Again, the preferred embodiment of the extension 44 is that the shaft 46 be hollow, and have a one-inch diameter for a length of two feet. The flighting 47 on the shaft 46 is preferably of a two inch diameter, which diameter includes that of the shaft. The length of the end 48 is preferably approximately two inches.

Under certain circumstances, the auger unit 33 comprising basically the drill 34 and the auger 36, with or without the extension 44, is sufficient for use by a person in the upper portion of a bin or the like without further equipment. Under these circumstances, the user may force the auger unit 33 downwardly into the grain 24, then merely "turn on" the drill 34 so that power is supplied to rotate the shaft 37, for example. This rotation will cause a stirring of the grain which in some instances may be sufficient to break up a pocket. In other circumstances, it is desirable to effect an automatic movement of the auger unit 33 within the confines of the roof 13 and the side wall 12. In this instance, a chain 49 of a length sufficient to keep the drill 34 out of the grain 24 when the auger unit 33 hangs straight downwardly from the upper portion of the roof is provided. The chain has an S-hook 51 at its upper end, with the lower end attached in any conventional manner to the drill 34. The hook 51 is engageable in any one of the plurality of pockets (not shown) which are an inherent part of the roof opening 16.

Upon operation the unit 33 is swung radially outwardly as far to one side as is possible (see FIG. 2) with the lower end of the shaft 37 inserted into the grain. Then, when the drill motor 34 is turned on, the shaft 37 will bite into the grain. Upon the first resistance to rotation of the shaft 37, the chain 49 will twist, acting as a torsion member in that it eventually locks. Thereupon, the shaft 37 will rotate within the grain. It has been found that as the shaft rotates, the auger unit 36 moves in a radial manner toward the longitudinal vertical center of the bin, whereupon the shaft 37 must then be removed from the grain.

The auger can then again be operated to move through the same radius; or, if desired, the hook 51 can be moved to another pocket in the opening 16, whereupon the auger unit 33 will make another radial pass from the outer periphery of the grain toward the longitudinal center thereof. It can be seen that after one or more of these radial passes, the pockets 25 and 26, and any others that have formed within the upper portion of the grain 24, will be broken up, such that air, indicated by the arrows in FIG. 2, can pass completely through all of the grain.

Some changes may be made in the constuction and arrangement of my portable grain aerator device without departing from the real spirit and purpose of my invention, and it is my intention to cover by my claim, any modified forms of structure or use of mechanical equivalents which may be reasonably included within its scope.

I claim:

A device for stirring granular material, comprising in combination:

a building for storing granular material, said building having a roof;

an auger conveyor;

power means attached to one end of said auger conveyor for rotating said auger conveyor about its longitudinal axis; and a chain one end of which is secured to said power means, and the other end of which is attached to said roof for swingably suspending said power means and said auger conveyor within said building such that the other end of said auger conveyor can extend into the granular material.

References Cited by the Examiner

UNITED STATES PATENTS

| | | | |
|---|---|---|---|
| 1,721,553 | 7/29 | Haines | 259—97 |
| 1,828,268 | 10/31 | Wilkes | 198—213 |
| 2,016,268 | 10/35 | McMartin | 259—97 |
| 2,058,125 | 10/36 | Bean | 198—213 |
| 2,129,043 | 9/38 | Bortsch | 73—57 |
| 2,702,184 | 2/55 | Griffith | 198—213 X |
| 2,733,900 | 2/56 | Wobensmith | 259—135 |
| 2,895,720 | 7/59 | Koch | 198—213 X |
| 2,949,843 | 8/60 | Mack | 98—57 |
| 3,077,106 | 2/63 | Fink | 73—53 |
| 3,106,148 | 10/63 | Bothe | 98—57 |

MEYER PERLIN, *Primary Examiner.*

ROBERT A. O'LEARY, *Examiner.*